US012626996B2

(12) United States Patent
Ikeda et al.

(10) Patent No.: US 12,626,996 B2
(45) Date of Patent: May 12, 2026

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shuya Ikeda, Osaka (JP); Osamu Nakayama, Osaka (JP); Katsuhi Miyazaki, Osaka (JP); Mitsutoshi Morita, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 544 days.

(21) Appl. No.: 18/271,956

(22) PCT Filed: Jan. 13, 2022

(86) PCT No.: PCT/JP2022/000841
§ 371 (c)(1),
(2) Date: Jul. 12, 2023

(87) PCT Pub. No.: WO2022/163361
PCT Pub. Date: Aug. 4, 2022

(65) Prior Publication Data
US 2024/0154235 A1 May 9, 2024

(30) Foreign Application Priority Data
Jan. 26, 2021 (JP) ................................. 2021-010280

(51) Int. Cl.
*H01M 50/298* (2021.01)
*H01M 50/519* (2021.01)

(52) U.S. Cl.
CPC ....... *H01M 50/298* (2021.01); *H01M 50/519* (2021.01)

(58) Field of Classification Search
CPC ............ H01M 50/298; H01M 50/519; H01M 50/507; H01M 50/572; H01M 50/50; H01M 50/209; H01M 50/503; H01M 50/284
(Continued)

(56) References Cited

U.S. PATENT DOCUMENTS 12,431,580 B2 * 9/2025 Ikeda .................. H01M 50/298
12,494,553 B2 * 12/2025 Ikeda .................. H01M 50/519
(Continued)

FOREIGN PATENT DOCUMENTS

| | | |
|---|---|---|
| JP | 2013-045508 | 3/2013 |
| JP | 2019-057498 | 4/2019 |
| JP | 2020-191279 | 11/2020 |

OTHER PUBLICATIONS

International Search Report issued in WIPO Patent Application No. PCT/JP2022/000841, dated Mar. 15, 2022, along with an English translation thereof.

*Primary Examiner* — Angel R Estrada
(74) *Attorney, Agent, or Firm* — Greenblum & Bernstein, P.L.C.

(57) ABSTRACT
A wiring module is attached to a plurality of power storage elements and includes an FPC, a reinforcing plate attached to the FPC, and a protector for holding the FPC and the reinforcing plate. The FPC is electrically connected to electrode terminals of the plurality of power storage elements. The reinforcing plate has an attachment surface to which the FPC is attached. The protector is provided with a
(Continued)

mounting recess where the reinforcing plate is mounted. The mounting recess includes a plurality of side surface portions for suppressing displacement of the reinforcing plate in a direction that is perpendicular to a plate thickness direction of the reinforcing plate and an engaging portion for engaging an end portion of the attachment surface and suppressing displacement of the reinforcing plate in the plate thickness direction.

11 Claims, 13 Drawing Sheets

(58) Field of Classification Search
USPC ................................ 174/255, 256, 254, 260
See application file for complete search history.

(56) References Cited

U.S. PATENT DOCUMENTS

| | | | |
|---|---|---|---|
| 12,506,227 B2 * | 12/2025 | Fukushima ......... | H01M 50/519 |
| 2019/0088912 A1 | 3/2019 | Goh et al. | |
| 2019/0088918 A1 | 3/2019 | Goh et al. | |
| 2020/0365866 A1 | 11/2020 | Lin et al. | |

* cited by examiner

WIRING MODULE

TECHNICAL FIELD

The present disclosure relates to a wiring module.

BACKGROUND ART

A high-voltage battery pack used in an electric vehicle, a hybrid vehicle, or the like normally includes a large number of stacked batteries that are electrically connected in series or in parallel by a wiring module. In recent years, for space saving and other needs, flexible circuit boards have come into increasing use as main components in a wiring module. As one example of this type of wiring module, a battery connecting module described in JP 2019-057498A (Patent Document 1 cited below) is conventionally known. The battery connecting module described in Patent Document 1 includes a carrier tray, a bus bar, and a flexible circuit board connected to the bus bar.

In Patent Document 1, the flexible circuit board includes mounting holes, and the carrier tray includes mounting posts that are inserted through the mounting holes. After the mounting posts have been inserted through the mounting holes to position the flexible circuit board with respect to the carrier tray, the flexible circuit board can be fixed to the carrier tray by thermally welding the front end portions of the mounting posts.

CITATION LIST

Patent Documents

Patent Document 1: JP 2019-057498A

SUMMARY OF INVENTION

Technical Problem

However, when a flexible circuit board is fixed to a carrier tray by thermal welding as described above, it is necessary to provide mounting holes in the flexible circuit board, which has the risk of limiting the space for placing circuits and mounting other components on the flexible circuit board. In addition, processes such as thermal welding complicate the assembly work for a wiring module.

Solution to Problem

A wiring module according to an aspect of the present disclosure is a wiring module to be attached to a plurality of power storage elements and includes: a flexible printed circuit board; a reinforcing plate attached to the flexible printed circuit board; and a protector for holding the flexible printed circuit board and the reinforcing plate, wherein the flexible printed circuit board is electrically connected to electrode terminals of the plurality of power storage elements, the reinforcing plate has an attachment surface to which the flexible printed circuit board is attached, the protector is provided with a mounting recess where the reinforcing plate is mounted, and the mounting recess includes a plurality of side surface portions for suppressing displacement of the reinforcing plate in a direction that is perpendicular to a plate thickness direction of the reinforcing plate and an engaging portion for engaging an end portion of the attachment surface and suppressing displacement of the reinforcing plate in the plate thickness direction.

Advantageous Effects of Invention

According to the present disclosure, it is possible to provide a wiring module that facilitates assembly of a flexible printed circuit board while maintaining design freedom for the flexible printed circuit board.

BRIEF DESCRIPTION OF DRAWINGS

FIG. 2 is an enlarged front view depicting a periphery of a flexible printed circuit board of a power storage module.

FIG. 4 is an enlarged perspective view depicting a periphery of the flexible printed circuit board of the power storage module.

DESCRIPTION OF EMBODIMENTS

Description of Embodiments of Disclosure

Figure 1:
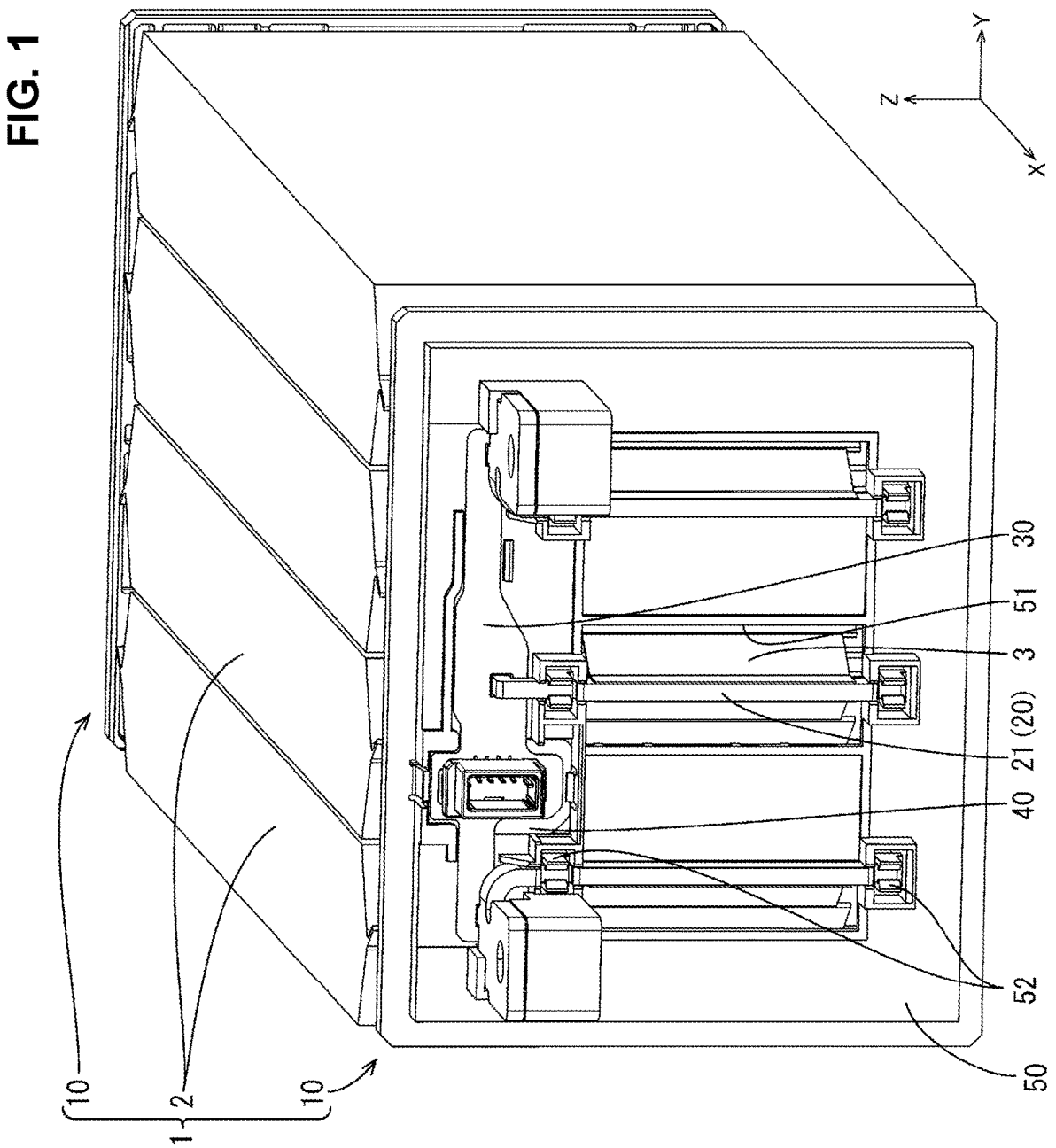
FIG. 1 is a perspective view of a power storage module according to a first embodiment.

Initially, modes of the present disclosure will be enumerated and described.

(1) A wiring module according to the present disclosure is a wiring module to be attached to a plurality of power storage elements and includes: a flexible printed circuit board; a reinforcing plate attached to the flexible printed circuit board; and a protector for holding the flexible printed circuit board and the reinforcing plate, wherein the flexible printed circuit board is electrically connected to electrode terminals of the plurality of power storage elements, the reinforcing plate has an attachment surface to which the flexible printed circuit board is attached, the protector is provided with a mounting recess where the reinforcing plate is mounted, and the mounting recess includes a plurality of side surface portions for suppressing displacement of the reinforcing plate in a direction that is perpendicular to a plate thickness direction of the reinforcing plate and an engaging portion for engaging an end portion of the attachment surface and suppressing displacement of the reinforcing plate in the plate thickness direction.

With the above configuration, it is possible to facilitate assembly of the flexible printed circuit board on the wiring module without a drop in design freedom for the flexible printed circuit board.

(2) The flexible printed circuit board preferably includes a connector, and the connector is preferably provided on an opposite side of the flexible printed circuit board to the reinforcing plate.

With the above configuration, it is easy to fix the connector to the flexible printed circuit board.

The wiring module according to the present disclosure may also have the following configuration.

(3) The connector preferably includes an opening which is open in the plate thickness direction and into which a mating connector fits.

With the above configuration, the connector and the mating connector can be fitted together in the plate thickness direction. When a mating or unmating operation of the connector is performed, the engaging portion can suppress displacement of the reinforcing plate in the mating direction.

The wiring module according to the present disclosure may also have the following configuration.

(4) The connector includes an opening which extends in a direction perpendicular to the plate thickness direction and into which a mating connector fits.

With the above configuration, it is possible to mate the connector and the mating connector in a direction that is perpendicular to the plate thickness direction. When a mating or unmating operation of the connector is performed, the plurality of side surface portions can suppress displacement of the reinforcing plate in the mating direction.

(5) It is preferable for a plurality of the engaging portions to be provided, and for the engaging portions to be disposed so as to be spaced apart from each other around an outer periphery of the mounting recess.

With the above configuration, it is easy to further suppress displacement of the reinforcing plate in the plate thickness direction with the plurality of engaging portions.

(6) The engaging portion preferably includes: an engagement catch capable of elastic deformation in a direction perpendicular to the plate thickness direction; and a restraining portion that suppresses displacement of the reinforcing plate toward an outside of the mounting recess when the reinforcing plate is mounted in the mounting recess by bending the engagement catch.

With the above configuration, it is easy to mount the reinforcing plate in the mounting recess.

(7) It is preferable that the plurality of side surface portions include a first side surface portion and a second side surface portion that are perpendicular to a first direction that is perpendicular to the plate thickness direction, the engagement catch is provided on the first side surface portion and is capable of elastic deformation in the first direction, the restraining portion is provided on the second side surface portion, and the engagement catch includes an inclined portion that is inclined so that a length by which the engagement catch protrudes from the first side surface portion toward the second side surface portion increases in a depth direction of the mounting recess, which is the plate thickness direction.

With the above configuration, it is possible to easily mount the reinforcing plate into the mounting recess by inserting one end portion in the first direction of the reinforcing plate into the mounting recess on the restraining portion side and pressing the other end portion in the first direction of the reinforcing plate toward a depth of the mounting recess so that the other end portion is slid along the inclined portion.

(8) The mounting recess preferably includes a pressing portion that suppresses displacement of the reinforcing plate in the first direction by pressing an outer edge portion of the reinforcing plate against the first side surface portion.

With the above configuration, it is possible to reduce vibration of the reinforcing plate in the first direction. The engagement between the engagement catch provided on the first side surface portion and the reinforcing plate is also unlikely to be dissolved.

(9) The pressing portion is preferably provided on the second side surface portion side of the mounting recess, and when a direction that is perpendicular to the plate thickness direction and the first direction is set as a second direction, the engagement catch and the pressing portion are preferably disposed at a same position in the second direction.

With the above configuration, since the engagement catch and the pressing portion are disposed at the same position in the second direction, the engagement between the engagement catch and the reinforcing plate is even more unlikely to be dissolved.

(10) The flexible printed circuit board is preferably disposed at one end in the first direction of the protector.

With the above configuration, assembly of the flexible printed circuit board is facilitated.

(11) It is preferable that the wiring module further includes bus bars to be connected to the electrode terminals, the protector includes a bus bar holding portion for holding the bus bars, the flexible printed circuit board includes bus bar connecting portions to be connected to the bus bars, and the reinforcing plate is disposed between bus bar connecting portions that are adjacent.

With the above configuration, by electrically connecting the bus bar connecting portions to the bus bars, it is possible to easily fix the flexible printed circuit board to the protector.

Detailed Description of Embodiments of Disclosure

Embodiments of the present disclosure will now be described further. The present disclosure is not limited to the illustrated configurations and is instead indicated by the range of the patent claims and intended to include all changes within the meaning and scope of the patent claims and their equivalents.

First Embodiment

A first embodiment of the present disclosure will now be described with reference to FIGS. 1 to 10. A power storage module 1 equipped with a wiring module 10 according to the present embodiment is mounted in a vehicle as a power source for driving the vehicle, which as examples may be an electric vehicle or a hybrid vehicle. In the following description, the direction indicated by arrow Z is upward, the direction indicated by arrow X is forward, and the direction indicated by arrow Y is leftward. In the present embodiment, the expression "plate thickness direction" is the front-rear direction, and the "first direction" is the vertical direction. The "second direction" is the left-right direction. Note that in this specification, out of a plurality of members that are identical, reference numerals may be assigned to only some of such members and the reference numerals of other such members may be omitted.

Figure 10:
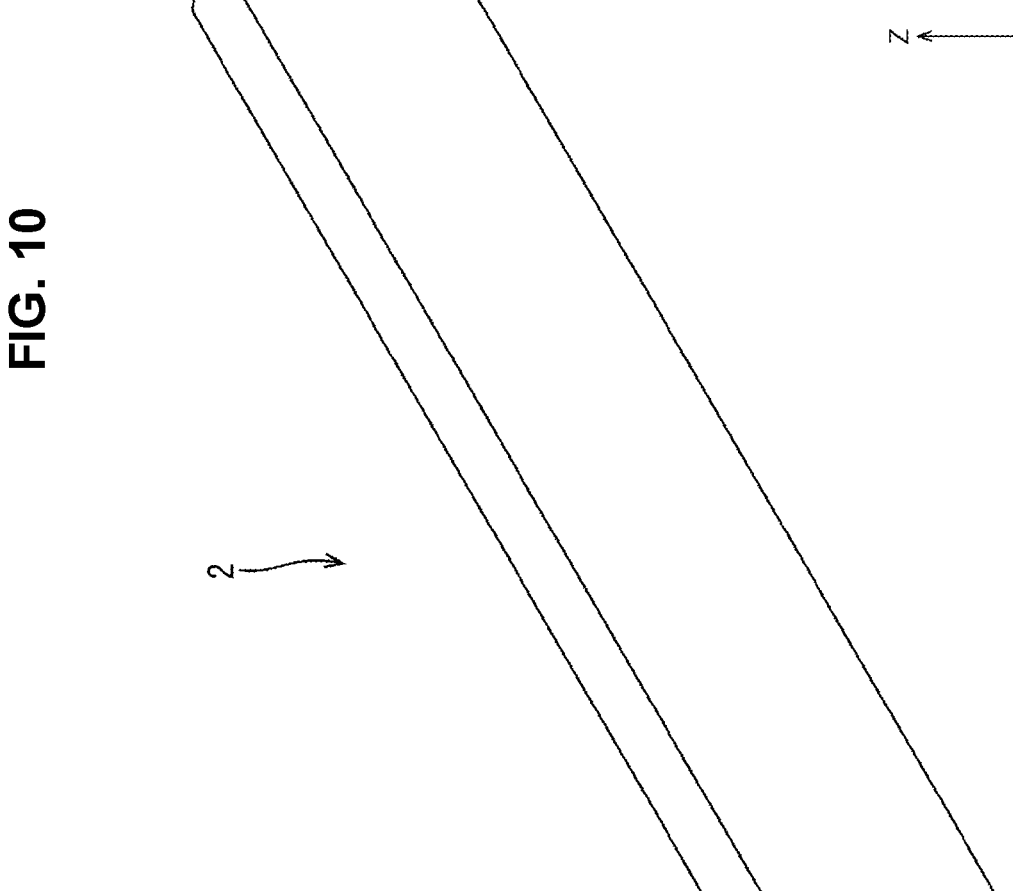
FIG. 10 is a perspective view of a power storage element.

As depicted in FIG. 1, the power storage module 1 is equipped with a plurality of power storage elements 2, which are aligned in the left-right direction, and wiring modules 10, which are attached to the front and rear sides of the plurality of power storage elements 2. As depicted in FIG. 10, each power storage element 2 is formed in a shape that is elongated in the front-rear direction and flattened in the left-right direction. A power storing component (not illustrated) is housed inside each power storage element 2. Electrode terminals 3, which form a pair, are respectively disposed on the two sides of each electric storage element 2 in the front-rear direction. The electrode terminals 3 protrude so as to face in opposite directions to each other. The pair of electrode terminals 3 are plate-shaped and have respectively opposite polarities.

Wiring Module

As depicted in FIG. 1, each wiring module 10 according to the present embodiment is equipped with bus bars 20 to be connected to the electrode terminals 3, a flexible printed circuit board (hereinafter abbreviated to "FPC") 30 to be connected to the bus bars 20, a reinforcing plate 40 to be attached to the FPC 30, and a protector 50 that holds the bus bars 20, the FPC 30, and the reinforcing plate 40. The wiring modules 10 are respectively attached to the front side and the rear side of the plurality of power storage elements 2. The configuration of the wiring module 10 disposed on the front side of the plurality of storage elements 2 is described in detail below. Since the configuration of the wiring module 10 disposed on the rear side of the plurality of storage elements 2 is the same as the wiring module 10 on the front side, description thereof is omitted.

Reinforcing Plate, Attachment Surface

Figure 2:
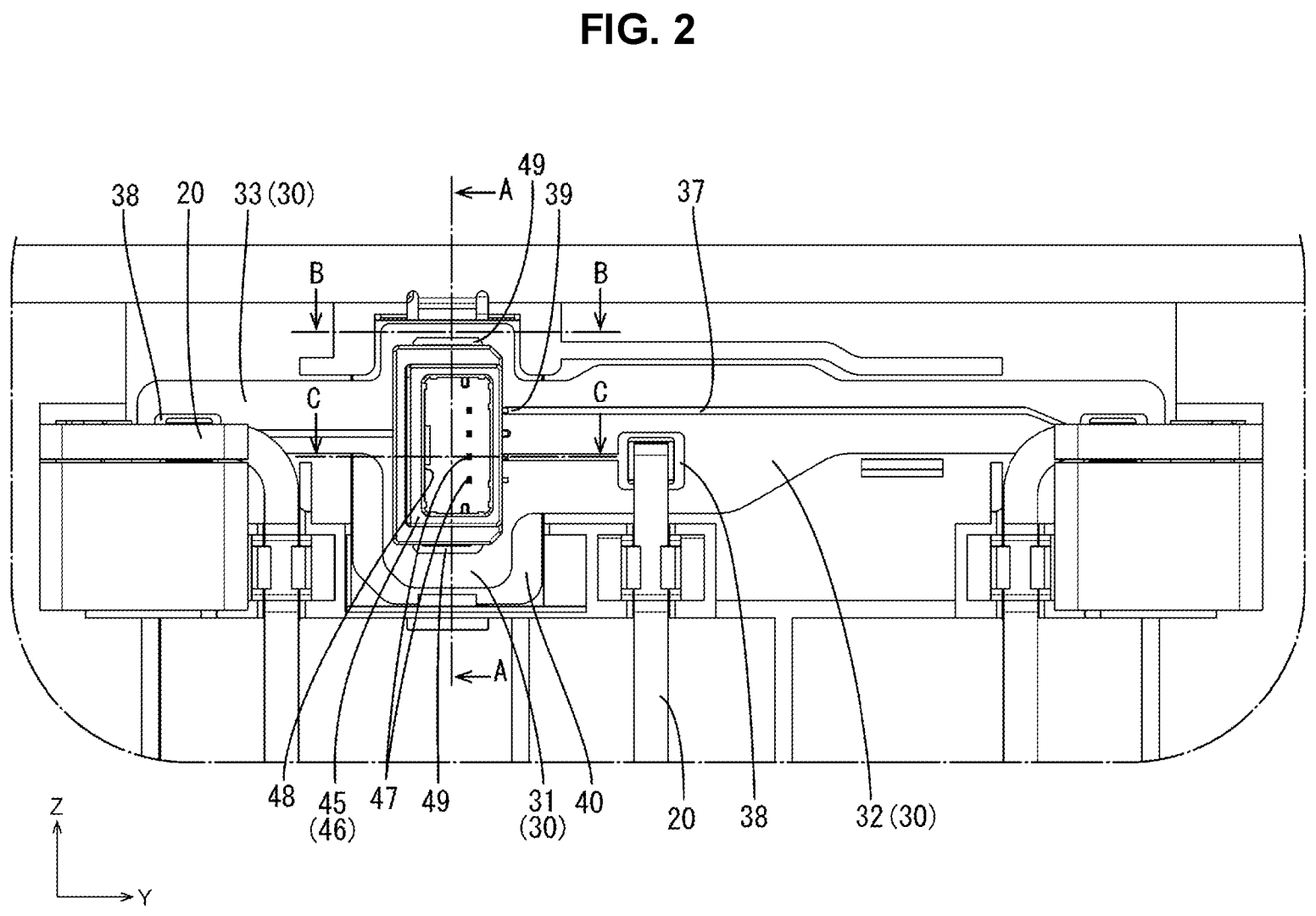
Figure 6:
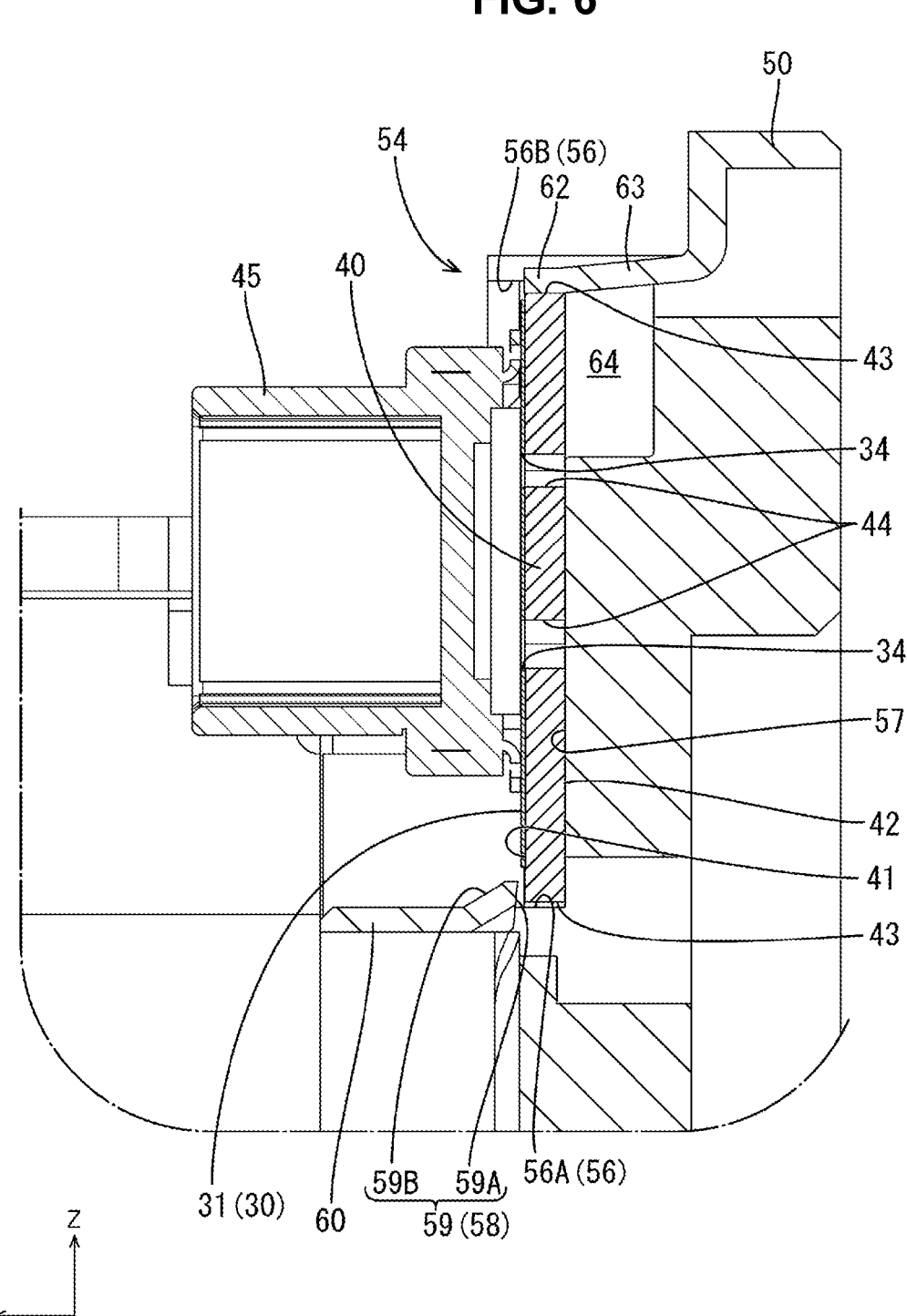
FIG. 6 is a cross-sectional view along a line A-A in FIG. 2.

As depicted in FIG. 6, the reinforcing plate 40 is made of an electrically insulating synthetic resin and is formed in a plate shape. The outer surface of the reinforcing plate 40 is provided with an attachment surface 41 to which the FPC 30 is attached, a rear surface 42 disposed on a rear side to the attachment surface 41, and an outer edge portion 43 that connects outer peripheries of the attachment surface 41 and the rear surface 42. Two first through-holes 44 are provided in a central portion of the reinforcing plate 40 so as to pass through in the front-rear direction. The reinforcing plate 40 is held by the protector 50 so that the plate thickness of the reinforcing plate 40 is oriented in the front-rear direction, with the attachment surface 41 facing forward and the rear surface 42 facing rearward. As depicted in FIG. 2, the reinforcing plate 40 is disposed at an intermediate position in a direction (that is, the left-right direction) in which the FPC 30 extends.

FPC

Figure 3:
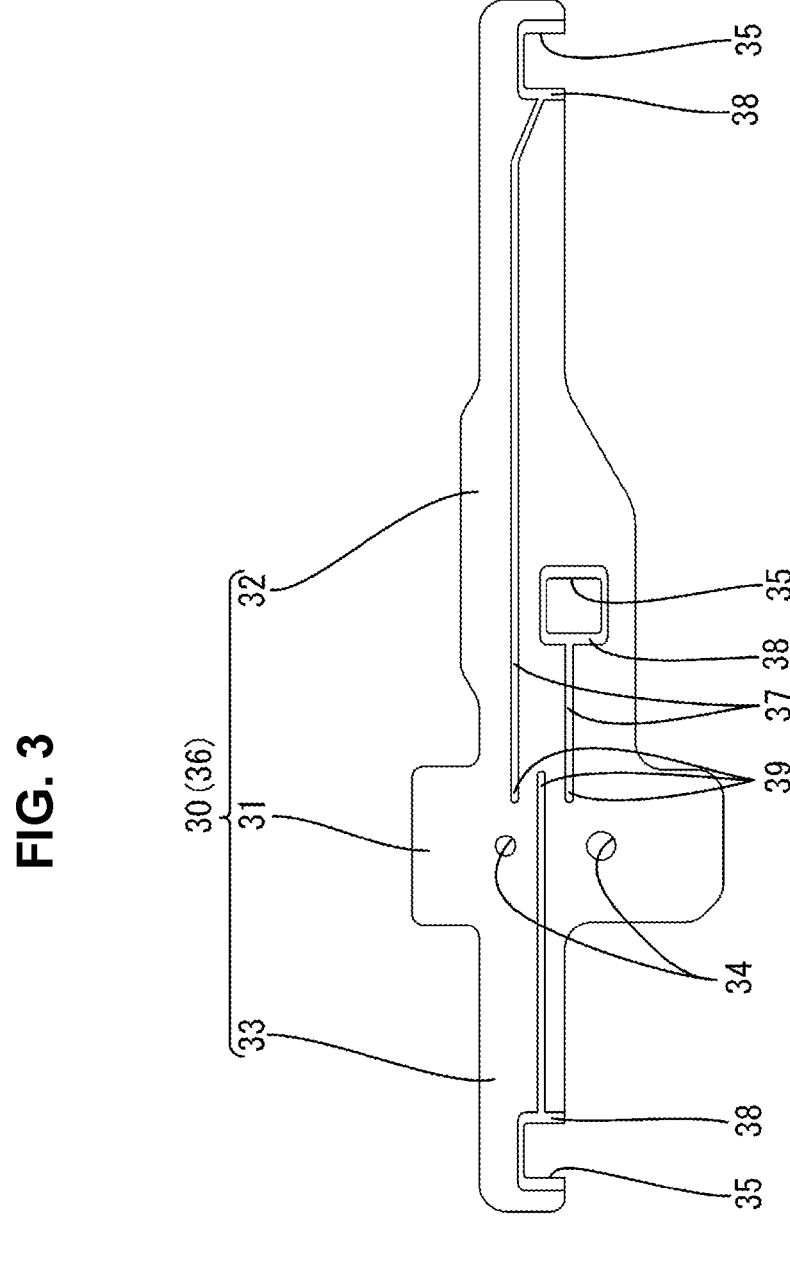
FIG. 3 is a front view of the flexible printed circuit board.
Figure 3:
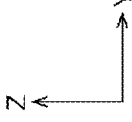
Figure 4:
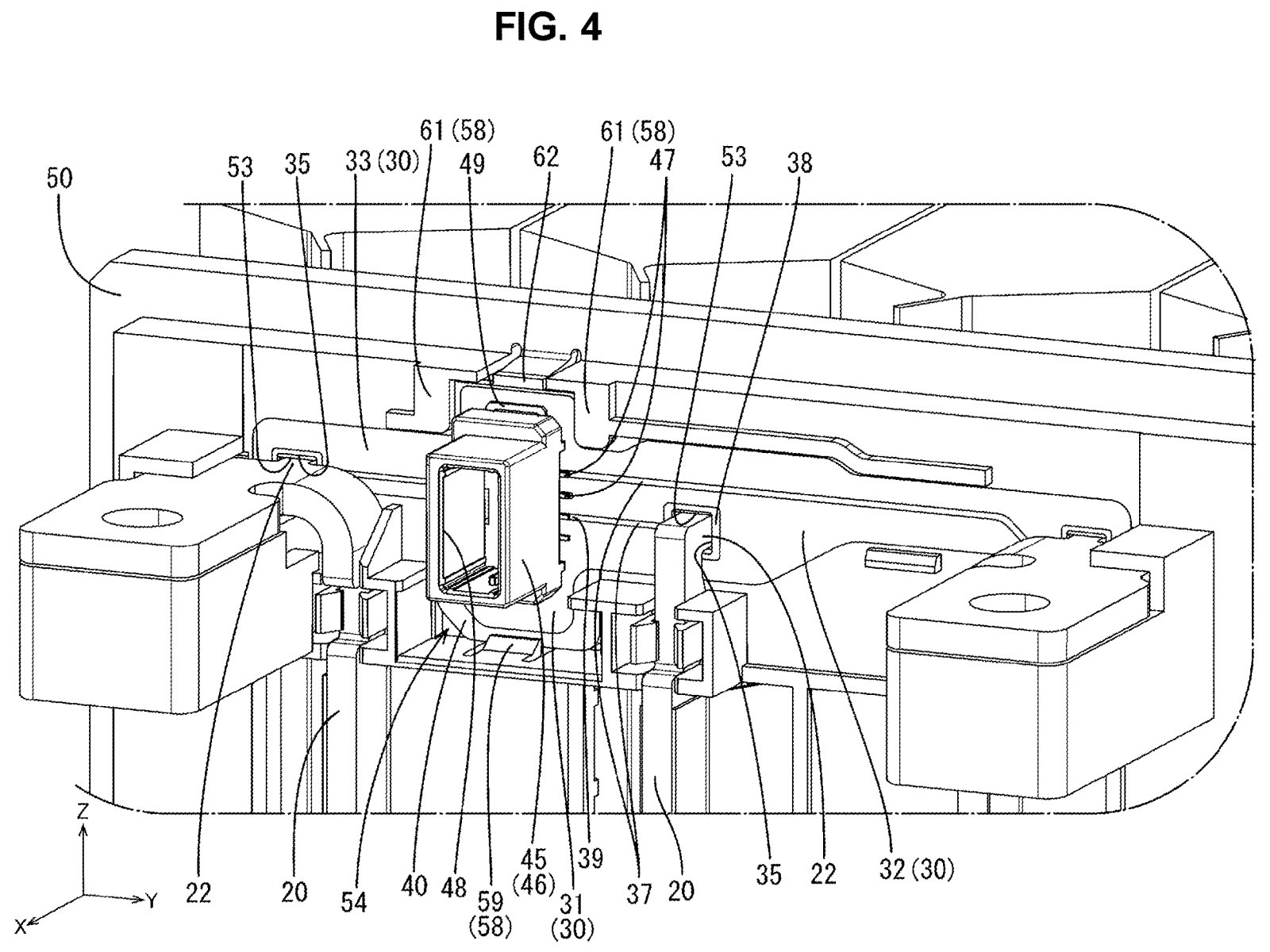

As depicted in FIG. 3, the FPC 30 is shaped so as to be elongated in the left-right direction and is assembled on the wiring module 10 so that the board thickness direction is aligned with the front-rear direction. The FPC 30 includes a reinforcing portion 31 disposed near the center in the left-right direction, a first routing portion 32 that extends leftward from the reinforcing portion 31, and a second routing portion 33 that extends rightward from the reinforcing portion 31. The reinforcing portion 31 is provided with two second through-holes 34 that pass through in the front-rear direction. By passing positioning pins through the second through-holes 34 and the first through-holes 44, the FPC 30 and the reinforcing plate 40 can be positioned as depicted in FIG. 6. The rear surface of the reinforcing portion 31 and the attachment surface 41 of the reinforcing plate 40 are attached using adhesive or the like. As depicted in FIGS. 3 and 4, the first routing portion 32 and the second routing portion 33 are formed with connection recesses 35 that are engaged by the protruding portions 22 of the bus bars 20. These connection recesses 35 may be disposed in central portions of the FPC 30 and formed so that the protruding portions 22 pass therethrough, or may be disposed at both left and right ends of the FPC 30 and configured to engage portions of the peripheries of the protruding portions 22.

Conductive Path

As depicted in FIG. 3, the FPC 30 includes a base film 36, conductive paths 37 routed on the front surface of the base film 36, and a coverlay film (not illustrated) that covers the conductive paths 37 from further in front. The base film 36 and the coverlay film are made of a synthetic resin, such as polyimide, that is electrically insulating and flexible. The conductive paths 37 are made of metal foil, such as copper or copper alloy.

Bus Bar Connecting Portion

As depicted in FIG. 3, each conductive path 37 includes a bus bar connecting portion 38 and a connector connecting portion 39. The coverlay film is provided with partial openings so that the bus bar connecting portions 38 and the connector connecting portions 39 are exposed to the front. Each bus bar connecting portion 38 is formed around a connection recess 35 and is disposed at one end of a conductive path 37. The connector connecting portions 39 are formed on the reinforcing portion 31 in parallel in the vertical direction and are disposed at the other ends of the conductive paths 37.

As depicted in FIG. 1, in the wiring module 10, the FPC 30 is constructed so as to be elongated in the left-right direction, which is the direction in which the plurality of storage elements 2 are stacked, and short in the vertical direction, which is perpendicular to the stacking direction. With this configuration, it is possible to ensure the FPC 30 and the bus bars 20 are electrically connected in each wiring module 10 and to reduce the amount of FPC 30 in use. Since the FPC 30 is disposed at an upper end of the protector 50, it is possible to facilitate tasks such as assembling the FPC 30 to the protector 50 and soldering on the FPC 30.

Bus Bars

Each bus bar 20 is formed in a plate shape and is formed by machining a conductive metal plate. As depicted in FIG. 1, each bus bar 20 is held by bus bar holding portions 52 provided on the upper and lower sides of the protector 50 so that the plate thickness direction is aligned in the left-right direction. A central part of each bus bar 20 is a bus bar main body portion 21 to which an electrode terminal 3 is connected. As depicted in FIG. 4, a protruding portion 22 that protrudes to the rear is provided on an upper portion of the bus bar 20. Each protruding portion 22 engages with a connection recess 35 of the FPC 30 and is soldered to the bus bar connecting portion 38. The front end of the protruding portion 22 that has engaged a connection recess 35 is received by a positioning hole 53 (see FIG. 5), which positions the bus bar 20 relative to the protector 50.

As depicted in FIG. 1, when the wiring modules 10 are attached to the front side and the rear side of the plurality of storage elements 2, the electrode terminals 3 are respectively inserted through electrode receiving portions 51 of the protector 50 and appropriately bent so as to contact the bus bar main body portions 21. The electrode terminals 3 and the corresponding bus bar main body portions 21 are then connected by laser welding.

Connectors and Openings

As depicted in FIGS. 2 and 4, the reinforcing portion 31 of the FPC 30 is provided with a connector 45. The connector 45 is disposed on the opposite side of the FPC 30 to the reinforcing plate 40. That is, since the reinforcing plate 40 is attached to the rear surface of the FPC 30, the connector 45 is provided on the front surface of the FPC 30. The connector 45 includes a housing 46 in the form of a vertically elongated cubic box and a plurality of terminals 47. The housing 46 has an opening 48 and is therefore open to the front. The opening 48 is provided so as to mate with a mating connector (not illustrated).

As depicted in FIGS. 2 and 4, fixing portions 49 made of metal are provided on side surfaces of the housing 46 that are perpendicular to the vertical direction. The connector 45 is fixed to the FPC 30 by soldering the fixing portions 49 to fixing lands (not depicted) on the FPC 30. Rear end portions of the terminals 47 are bent leftward (rightward in the drawings) and electrically connected to the corresponding connector connecting portions 39 of the conductive paths 37 by soldering.

Protector

Figure 5:
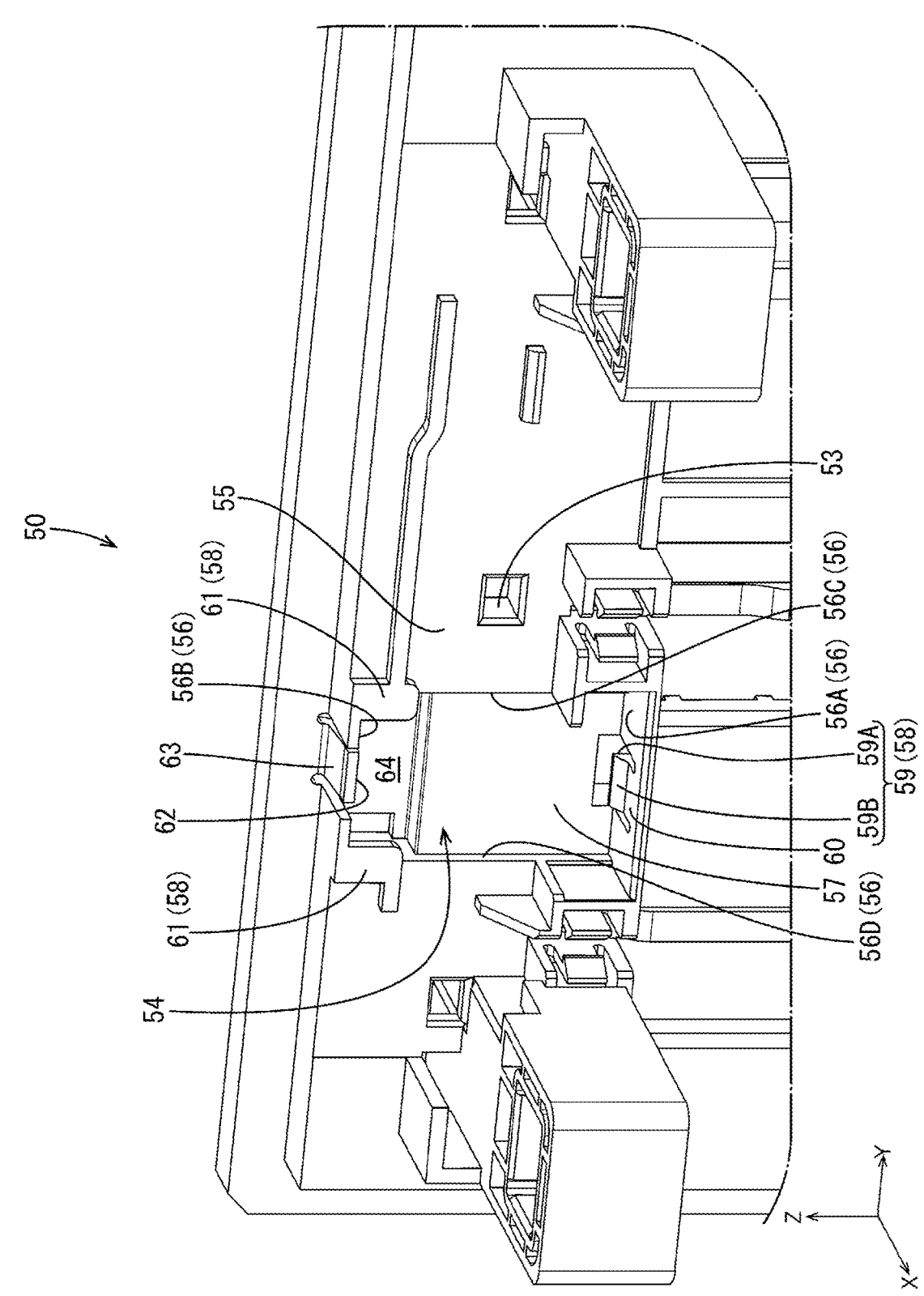
FIG. 5 is an enlarged perspective view depicting a periphery of a mounting recess of a protector.

The protector 50 is made of an electrically insulating synthetic resin and is formed in a plate shape. As depicted in FIG. 1, the electrode receiving portions 51 are provided in a central portion in the vertical direction of the protector 50 and are in parallel in the left-right direction. The electrode receiving portions 51 are formed in vertically elongated rectangular shapes so as to pass through the protector 50 in the front-rear direction. The bus bar holding portions 52 that hold the bus bars 20 are provided in upper and lower portions of the protector 50. As depicted in FIGS. 4 and 5, the positioning holes 53 for receiving the front ends of the protruding portions 22 of the bus bars 20 are provided in the upper portion of the protector 50.

Mounting Recess and Plurality of Side Surface Portions

Figure 7:
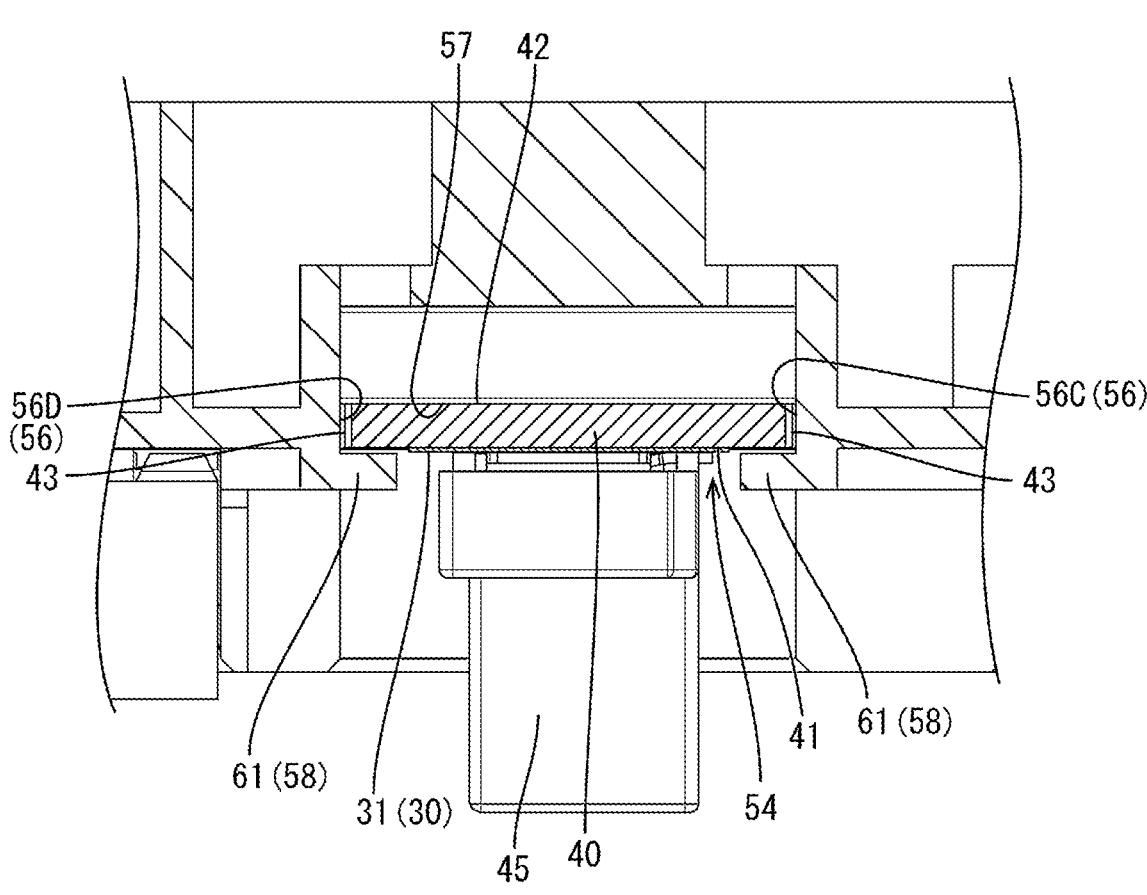
FIG. 7 is a cross-sectional view along a line B-B in FIG. 2.
Figure 7:
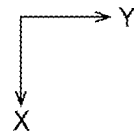
Figure 8:
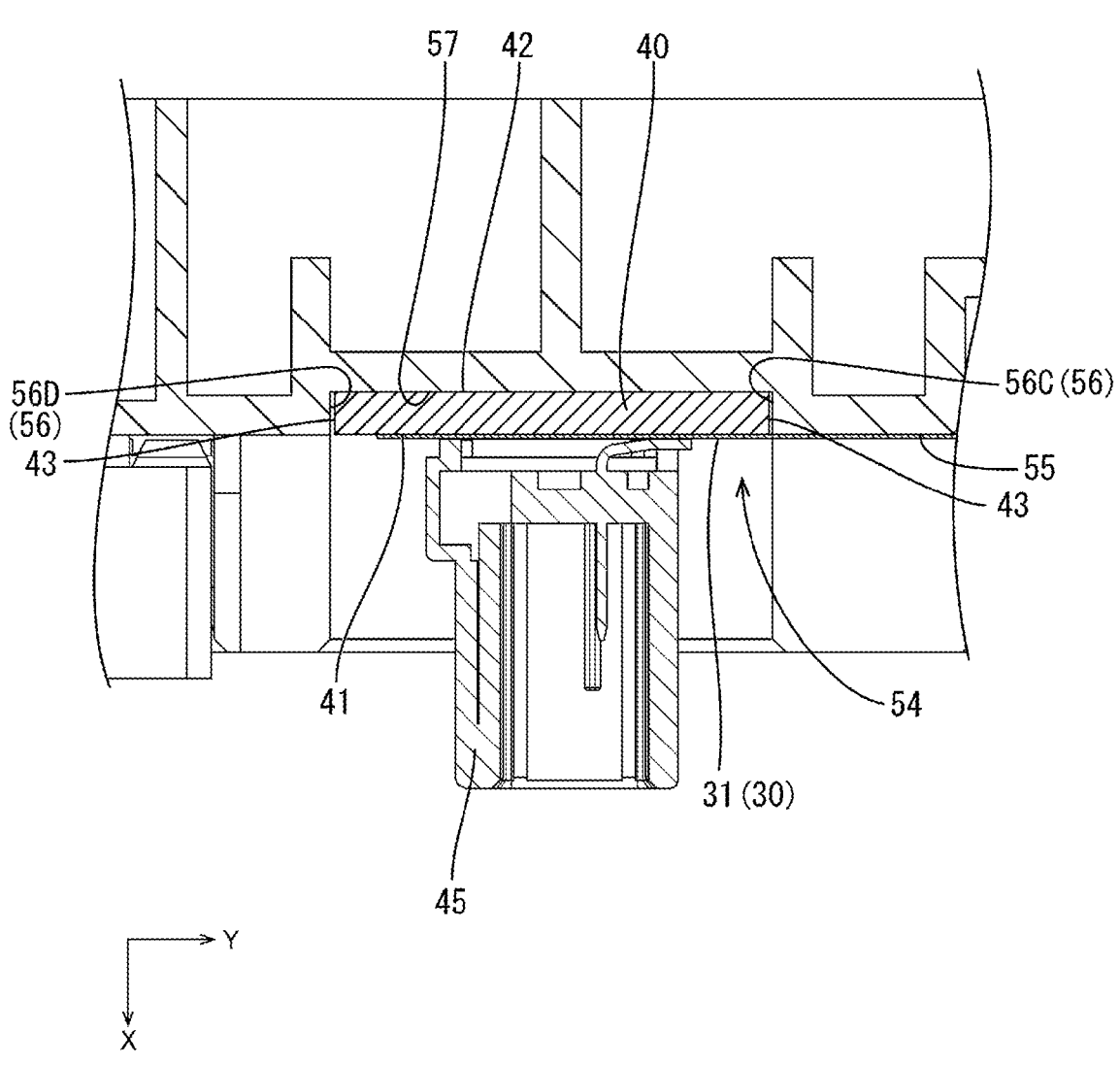
FIG. 8 is a cross-sectional view along a line C-C in FIG. 2.
Figure 9:
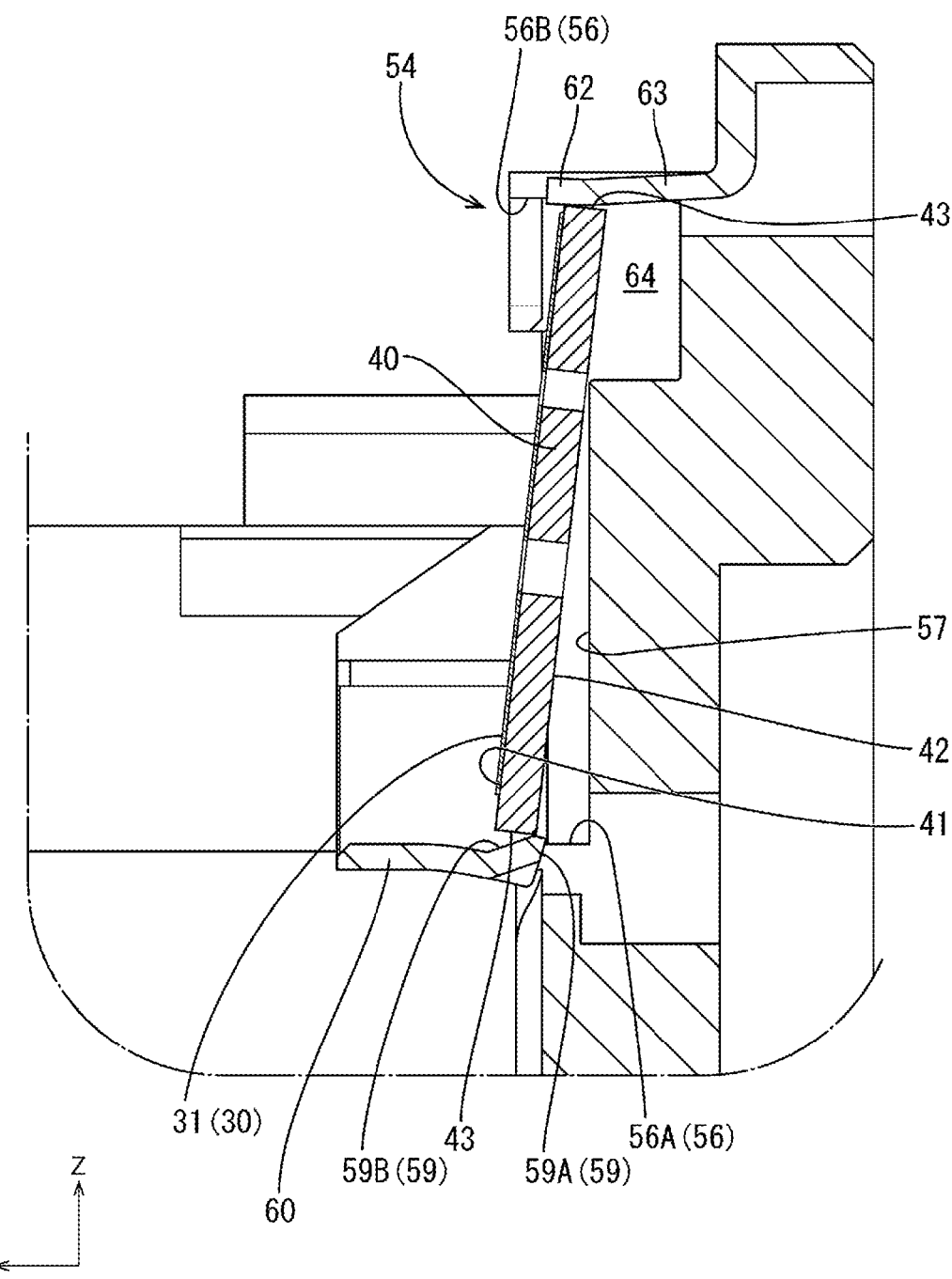
FIG. 9 is a diagram depicting how a reinforcing plate is mounted, in a mounting recess, in a cross section along the line A-A in FIG. 2.

As depicted in FIG. 4, the protector 50 is provided with a mounting recess 54 in which the reinforcing plate 40 is mounted. As depicted in FIG. 5, the mounting recess 54 is recessed from a placement surface 55 where the FPC 30 is placed, and includes a plurality of side surface portions 56 and a bottom surface portion 57. The plurality of side surface portions 56 are composed of four surfaces. Out of the plurality of side surface portions 56, the lower side surface is a first side surface portion 56A, the upper side surface is a second side surface portion 56B, the left side surface is a third side surface portion 56C, and the right side surface is a fourth side surface portion 56D. The first side surface portion 56A and the second side surface portion 56B are disposed so as to be perpendicular to the first direction (the up-down direction), and the third side surface portion 56C and the fourth side surface portion 56D are disposed so as to be perpendicular to the left-right direction. As depicted in FIGS. 6 to 8, the plurality of side surface portions 56 contact the outer edge portion 43 of the reinforcing plate 40 from above, below, left and right, which suppresses displacement of the reinforcing plate 40 in a direction that is perpendicular to the plate thickness direction (that is, the front-rear direction). The bottom surface portion 57 is provided perpendicular to the front-rear direction, and contacts the rear surface 42 of the reinforcing plate 40.

Engaging Portion

As depicted in FIGS. 6 and 7, the mounting recess 54 includes an engaging portion 58 that engages an end portion of the attachment surface 41 of the reinforcing plate 40 and thereby suppresses displacement of the reinforcing plate 40 in the front-rear direction. In addition, as depicted in FIG. 6, the mounting recess 54 includes a pressing portion 62 that elastically engages the outer edge portion 43 of the reinforcing plate 40 and suppresses displacement of the reinforcing plate 40 in the vertical direction. As described in detail below and depicted in FIG. 5, the engaging portion 58 and the pressing portion 62 are provided at both ends of the mounting recess 54 in the first direction (that is, the vertical direction). This means that when, as in the present embodiment, the first direction is set as perpendicular to the stacking direction (the left-right direction) of the plurality of storage elements 2, which is also the direction in which the FPC 30 extends, it is preferable for the FPC 30, the engaging portion 58, and the pressing portion 62 to not interfere with each other (see FIG. 4) when the reinforcing plate 40 is mounted in the mounting recess 54.

Engagement Catch, Inclined Portion

In the present embodiment, as depicted in FIG. 5, a plurality of (in the present embodiment, three) engaging portions 58 are provided and are disposed so as to be spaced apart from each other around the outer periphery of the mounting recess 54. The engaging portions 58 include an engagement catch 59 and two restraining portions 61. The engagement catch 59 is provided so as to protrude upward from the first side surface portion 56A, and is disposed at a central position in the left-right direction on a lower side of the mounting recess 54. The engagement catch 59 is provided at a front end portion of a first flexible piece 60 formed on the first side surface portion 56A. The first flexible piece 60 is formed to extend rearward from a front base end of the first side surface portion 56A and enables the engagement catch 59 to deform elastically in the vertical direction. As depicted in FIG. 6, a rear end portion 59A of the engagement catch 59 is disposed so as to engage a lower end portion of the attachment surface 41 of the reinforcing plate 40. An upper part of the engagement catch 59 is formed as a tapered inclined portion 59B. The inclined portion 59B is inclined in the front-rear direction so that a length by which the engagement catch 59 protrudes from the first side surface portion 56A toward the second side surface portion 56B (that is, upward) increases in the depth direction (that is, rearward) in the mounting recess 54, which is the front-rear direction.

Restraining Portion

As depicted in FIG. 5, two restraining portions 61 are provided so as to extend downward from the second side surface portion 56B. These restraining portions 61 are disposed at the upper left and right ends of the mounting recess 54. As depicted in FIG. 7, the restraining portion 61 disposed at the left end is connected to an upper end of the third side surface portion 56C, and the restraining portion 61 at the right end is connected to an upper end of the fourth side surface portion 56D. This means that the restraining portions 61 are less likely to become displaced or deformed in the vertical direction. The rear surfaces of the restraining portions 61 engage the upper left and upper right ends of the attachment surface 41 of the reinforcing plate 40. As will be described later, the restraining portions 61 suppress displacement of the reinforcing plate 40 toward the outside of the mounting recess 54 when the reinforcing plate 40 is mounted in the mounting recess 54 by bending the engagement catch 59.

As described above, in the mounting recess 54, the plurality of side surface portions 56 contact the outer edge portion 43 of the reinforcing plate 40, and the engagement catch 59 and restraining portion 61 engage the end portions of the attachment surface 41 of the reinforcing plate 40, resulting in the protector 50 holding the reinforcing plate 40 and the FPC 30 (see FIGS. 6 and 7). This means that at least the reinforcing portion 31 of the FPC 30 attached to the reinforcing plate 40 does not need to be provided with a structure for engaging the protector 50. That is, the reinforcing portion 31 of the FPC 30 can be fixed to the protector 50 with no loss in the degree of design freedom.

As depicted in FIGS. 2 and 4, the bus bars 20 are soldered to the bus bar connecting portions 38 provided on the first routing portion 32 and the second routing portion 33 of the FPC 30, which results in the bus bars 20 being held on the protector 50. That is, since the first routing portion 32 and the second routing portion 33 also serve as configurations that enable the bus bar connecting portions 38 to engage the protector 50, the first routing portion 32 and the second routing portion 33 can be fixed to the protector 50 with effectively no loss in the degree of design freedom.

In addition, the reinforcing portion 31 to which the reinforcing plate 40 is attached is disposed between the adjacent bus bar connecting portions 38. Accordingly, the reinforcing portion 31 near the center of the FPC 30 is firmly fixed to the protector 50 by engagement of the reinforcing plate 40 and the protector 50, and by soldering both ends of the FPC 30 in the left-right direction to the bus bar connecting portions 38 and the bus bars 20, it is possible to provide supplementary support to the protector 50. That is, it becomes easier to assemble the FPC 30 as a whole on the protector 50.

Contacting Portion

As depicted in FIG. 5, a pressing portion 62 is provided at a central position in the left-right direction on the upper side (that is, the second side surface portion 56B side) of the mounting recess 54. The pressing portion 62 is disposed at a front end portion of a second flexible piece 63 provided on the second side surface portion 56B. The second flexible piece 63 is formed to extend forward from a base end portion on the rear side of the second side surface portion 56B, and the pressing portion 62 and the second flexible piece 63 are capable of elastic deformation in the vertical direction. As depicted in FIG. 6, part of the second flexible piece 63 and the pressing portion 62 protrude downward from the second side surface portion 56B. The pressing portion 62 is formed so as to elastically engage with an upper outer edge portion 43 of the reinforcing plate 40 and press the lower outer edge portion 43 of the reinforcing plate 40 against the first side surface portion 56A. Due to this, displacement of the reinforcing plate 40 in the vertical direction is suppressed.

As depicted in FIG. 6, an insertion space 64, which extends in a depth direction of the bottom surface portion 57 (that is, rearward) and into which the reinforcing plate 40 can be inserted, is provided on the upper side of the mounting recess 54. As depicted in FIG. 5, the insertion space 64 is disposed on an opposite side in the first direction (that is, the vertical direction) to the engagement catch 59, and on the same side in the first direction (that is, the vertical direction) as the restraining portion 61. With this configuration, the reinforcing plate 40 can be smoothly mounted in the mounting recess 54.

The configuration of the present embodiment is as described above, and an example of assembling of the wiring module 10 will be described below.

First, the FPC 30 is attached to the reinforcing plate 40 using adhesive or the like. Alignment is performed so that the first through holes 44 of the reinforcing plate 40 and the corresponding second through holes 34 of the FPC 30 match, and the attachment surface 41 of the reinforcing plate 40 and the rear surface of the FPC 30 are stuck together (see FIG. 6).

Next, the reinforcing plate 40 is mounted in the mounting recess 54. With the rear surface 42 of the reinforcing plate 40 facing inward into the mounting recess 54, the upper end portion of the reinforcing plate 40 is inserted into the insertion space 64 of the mounting recess 54. While pressing the upper outer edge portion 43 of the reinforcing plate 40 against the second flexible piece 63 and the second side surface portion 56B, the upper end portion of the reinforcing plate 40 is disposed to the rear of the lower end portion, and then the lower end portion of the reinforcing plate 40 is brought close to the bottom surface portion 57. When doing so, the restraining portion 61 prevents the upper end portion of the reinforcing plate 40 from becoming displaced toward the front. When the rear surface 42 of the reinforcing plate 40 has approached the bottom surface portion 57, the lower outer edge portion 43 of the reinforcing plate 40 engages the inclined portion 59B of the engagement catch 59 and causes the first flexible piece 60 to elastically deform downward (see FIG. 9). When the lower outer edge portion 43 of the reinforcing plate 40 has passed over the inclined portion 59B, the first flexible piece 60 returns to its natural state, and the rear end portion 59A of the engagement catch 59 engages the lower end portion of the attachment surface 41. By doing so, mounting of the reinforcing plate 40 in the mounting recess 54 is completed (see FIG. 6). Since the pressing portion 62 presses the lower outer edge portion 43 of the reinforcing plate 40 against the first side surface portion 56A, engagement of the reinforcing plate 40 with the engagement catch 59 connected to the first side surface portion 56A is unlikely to be dissolved.

Also, in the present embodiment, the engagement catch 59 and the pressing portion 62 are disposed at the same position in the left-right direction (a central position in the left-right direction of the mounting recess 54). This means that the pressing portion 62 presses the part of the outer edge portion 43 engaged by the engagement catch 59 (that is, a lower end in a central position in the left-right direction of the attachment surface 41) especially strongly against the first side surface portion 56A. Accordingly, the engagement between the engagement catch 59 and the reinforcing plate 40 according to the present embodiment is unlikely to be dissolved compared to an example configuration where, unlike the present embodiment, the engagement catch and the contacting portion are disposed so as to be displaced in the left-right direction.

The connector 45 is mounted on the FPC 30. That is, the fixing portion 49 and the fixing land are soldered together, and rear end portions of the terminals 47 and the connector connecting portions 39 are soldered together. Finally, the bus bars 20 are assembled on the protector 50. While inserting the upper and lower portions of the bus bars 20 into the bus bar holding portions 52, the protruding portions 22 are caused to engage the connection recesses 35 of the FPC 30 and are inserted into the positioning holes 53 of the protector 50 (see FIG. 4). After this, the protruding portions 22 and the bus bar connecting portions 38 are soldered together. By doing so, assembly of the wiring module 10 is completed.

Effects of First Embodiment

The first embodiment has the following effects.

The wiring module 10 according to the first embodiment is a wiring module 10 to be attached to a plurality of power storage elements 2 and includes: an FPC 30; a reinforcing plate 40 attached to the FPC 30; and a protector 50 for holding the FPC 30 and the reinforcing plate 40, wherein the FPC 30 is electrically connected to electrode terminals 3 of the plurality of power storage elements 2, the reinforcing plate 40 has an attachment surface 41 to which the FPC 30 is attached, the protector 50 is provided with a mounting recess 54 where the reinforcing plate 40 is mounted, and the mounting recess 54 includes a plurality of side surface portions 56 for suppressing displacement of the reinforcing plate 40 in a direction that is perpendicular to a plate thickness direction of the reinforcing plate 40 and an engaging portion 58 for engaging an end portion of the attachment surface 41 and suppressing displacement of the reinforcing plate 40 in the plate thickness direction.

With the above configuration, it is possible to facilitate assembly of the FPC 30 on the wiring module 10 without a drop in design freedom for the FPC 30.

In the first embodiment, the FPC 30 includes the connector 45, and the connector 45 is provided on an opposite side of the FPC 30 to the reinforcing plate 40.

With the above configuration, it is easy to fix the connector 45 to the FPC 30.

In the first embodiment, the connector 45 includes an opening 48 which is open in the plate thickness direction and into which a mating connector fits.

With the above configuration, it is possible to mate the connector 45 and the mating connector in the plate thickness direction. When a mating or unmating operation of the connector 45 is performed, the engaging portion 58 can suppress displacement of the reinforcing plate 40 in the mating direction.

In the first embodiment, a plurality of the engaging portions 58 are provided, and the engaging portions 58 are disposed so as to be spaced apart from each other around an outer periphery of the mounting recess 54.

With the above configuration, it is easy to further suppress displacement of the reinforcing plate 40 in the plate thickness direction with the plurality of engaging portions 58.

In the first embodiment, the engaging portion 58 includes: the engagement catch 59 which is capable of elastic deformation in a direction perpendicular to the plate thickness direction; and the restraining portion 61 that suppresses displacement of the reinforcing plate 40 toward an outside of the mounting recess 54 when the reinforcing plate 40 is mounted in the mounting recess 54 by bending the engagement catch 59.

With the above configuration, it is easy to mount the reinforcing plate 40 in the mounting recess 54.

In the first embodiment, the plurality of side surface portions 56 include the first side surface portion 56A and the second side surface portion 56B that are perpendicular to the first direction that is perpendicular to the plate thickness direction, the engagement catch 59 is provided on the first side surface portion 56A and capable of elastic deformation in the first direction, the restraining portion 61 is provided on the second side surface portion 56B, and the engagement catch 59 includes an inclined portion 59B that is inclined so that a length that the engagement catch 59 protrudes from the first side surface portion 56A toward the second side surface portion 56B increases in a depth direction of the mounting recess 54, which is the plate thickness direction.

With the above configuration, it is possible to easily mount the reinforcing plate 40 into the mounting recess 54 by inserting one end portion (the upper end portion) in the first direction of the reinforcing plate 40 into the mounting recess 54 on the restraining portion 61 side and pressing the other end portion (the lower end portion) in the first direction of the reinforcing plate 40 toward a depth of the mounting recess 54 so that the other end portion is slid along the inclined portion 59B. It is also easy to confirm that the reinforcing plate 40 has been mounted in the mounting recess 54.

In the first embodiment, the mounting recess 54 includes the pressing portion 62 that suppresses displacement of the reinforcing plate 40 in the first direction by pressing an outer edge portion 43 of the reinforcing plate 40 against the first side surface portion 56A.

With the above configuration, it is possible to reduce vibration of the reinforcing plate 40 in the first direction. The engagement between the engagement catch 59 provided on the first side surface portion 56A and the reinforcing plate 40 is also unlikely to be dissolved.

In the first embodiment, the pressing portion 62 is provided on the second side surface portion 56B side of the mounting recess 54, and when a direction that is perpendicular to the plate thickness direction and the first direction is regarded as a second direction, the engagement catch 59 and the pressing portion 62 are disposed at the same position in the second direction.

With the above configuration, since the engagement catch 59 and the pressing portion 62 are disposed at the same position in the second direction, the engagement between the engagement catch 59 and the reinforcing plate 40 is even more unlikely to be dissolved.

In the first embodiment, the FPC 30 is disposed at one end (the upper end portion) in the first direction of the protector 50.

With the above configuration, assembly of the FPC 30 is facilitated.

The wiring module 10 according to the first embodiment includes the bus bars 20 to be connected to the electrode terminals 3, the protector 50 includes a bus bar holding portion 52 for holding the bus bars 20, the FPC 30 includes the bus bar connecting portions 38 to be connected to the bus bars 20, and the reinforcing plate 40 is disposed between the bus bar connecting portions 38 that are adjacent.

With the above configuration, by electrically connecting the bus bar connecting portions 38 and the bus bars 20, it is possible to easily fix the FPC 30 to the protector 50.

Second Embodiment

Figure 11:
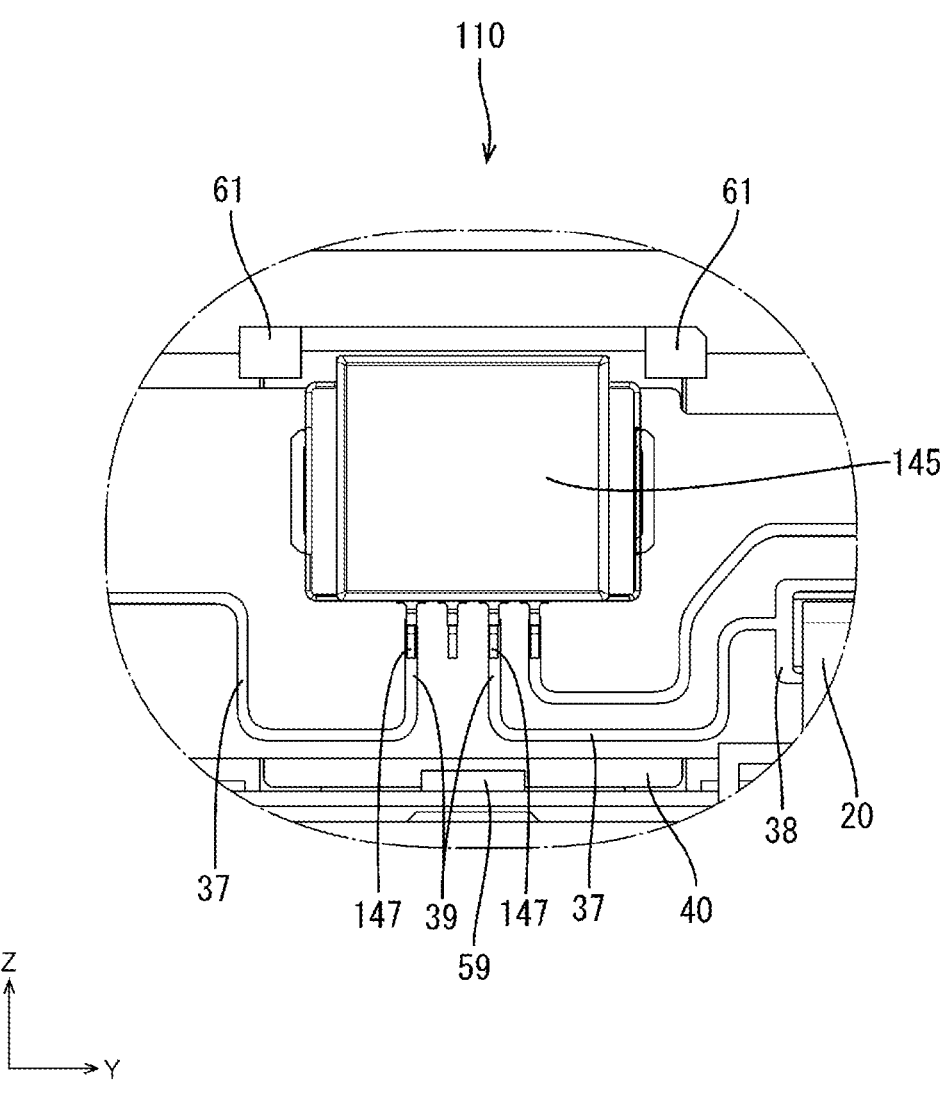
FIG. 11 is an enlarged front view depicting a periphery of a connector of a power storage module according to a second embodiment.

A second embodiment of the present disclosure will now be described with reference to FIGS. 11 to 13. Since a wiring module 110 according to the second embodiment is configured in the same way as in the first embodiment except for a connector 145 and a second side surface portion 156B of a mounting recess 154, description of members, operations, and effects that are the same as the first embodiment has been omitted. Note that out of a plurality of members that are identical, reference numerals may be assigned to only some of such members and the reference numerals of other such members may be omitted.

Figure 12:
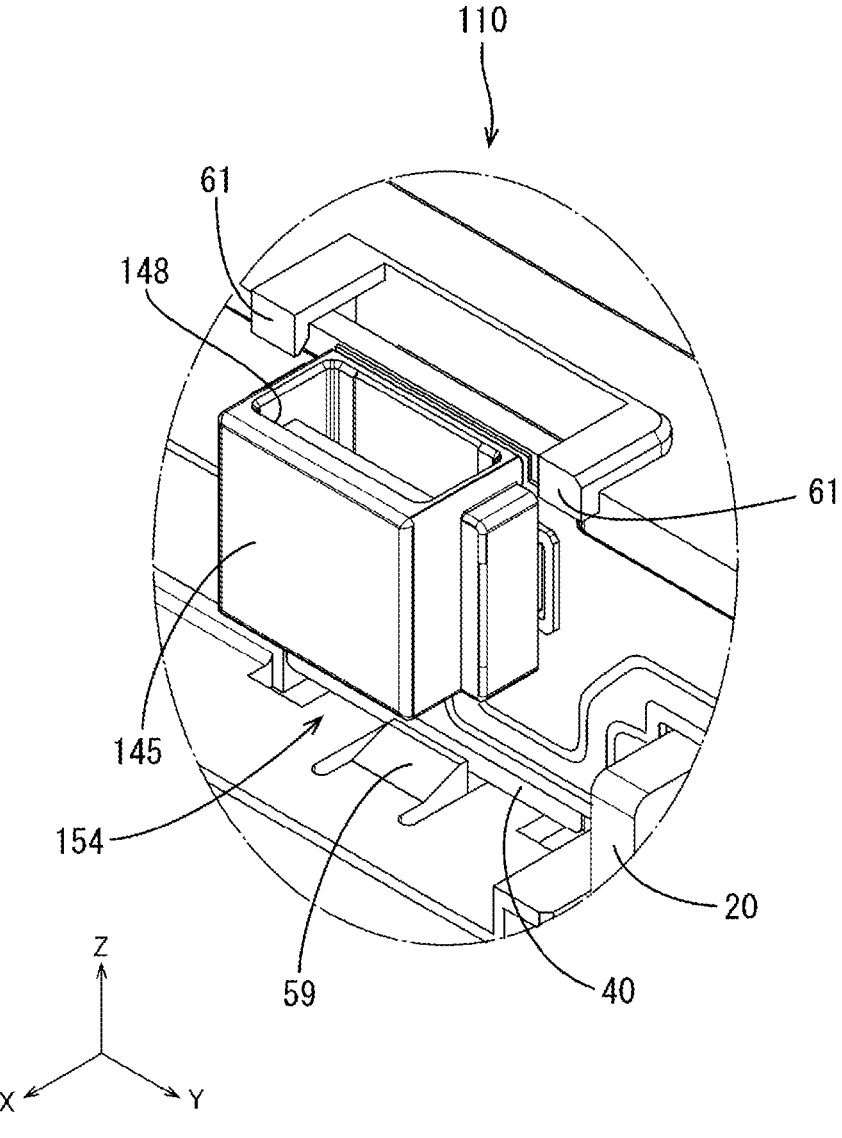
FIG. 12 is an enlarged perspective view depicting a periphery of a connector of the power storage module.

As depicted in FIG. 12, the connector 145 according to the second embodiment includes an opening 148 which opens upward and into which a mating connector (not illustrated) fits. As depicted in FIG. 11, an upper end of the connector 145 and an upper end of the reinforcing plate 40 are positioned at substantially the same height in order to facilitate fitting together of the connector 145 and the mating connector. Terminals 147 of the connector 145 extend vertically, and lower end portions of the terminals 147 are connected to the connector connecting portions 39.

Figure 13:
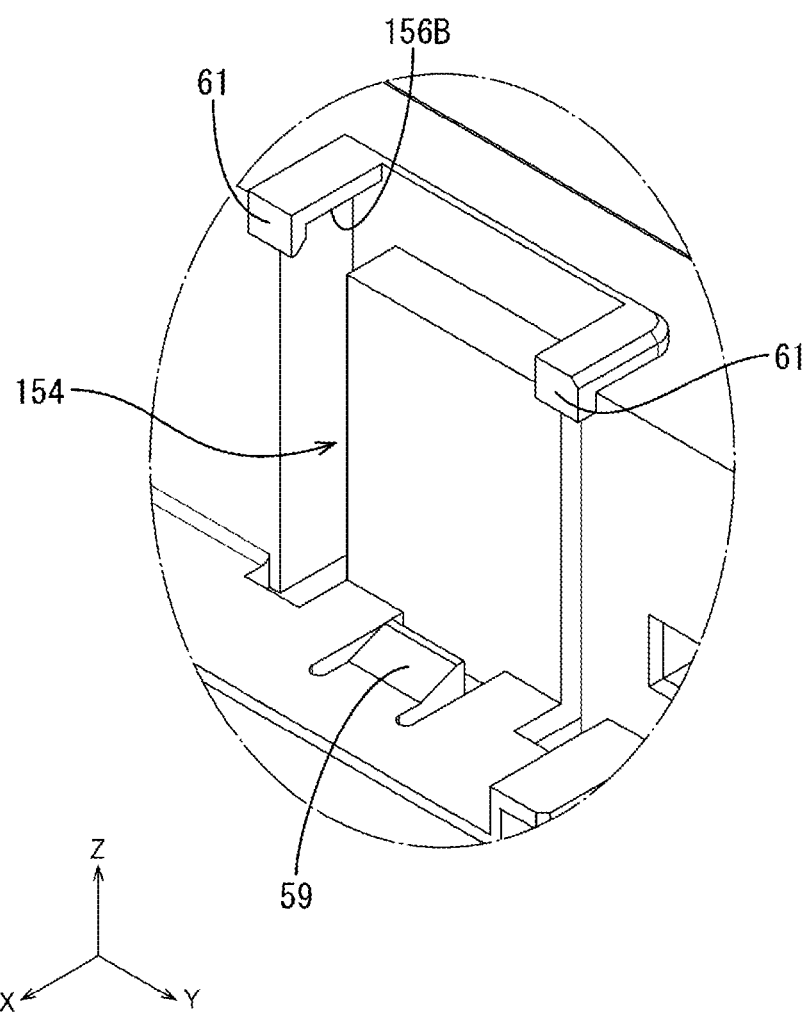
FIG. 13 is an enlarged perspective view depicting a periphery of a mounting recess of a protector.

As depicted in FIG. 13, in the mounting recess 154 according to the second embodiment, the second side surface portion 156B is provided only at both ends in the left-right direction of the mounting recess 154 (that is, the portions where the restraining portions 61 are provided). The mounting recess 154 is not provided with the pressing portion 62 (see FIG. 5) of the first embodiment. By not providing an engagement structure in the vicinity of the opening 148 of the connector 145, that is, in an upper central position in the left-right direction of the mounting recess 154 in this way, a fitting operation of the connector 145 is not obstructed. (see FIG. 12).

Effects of Second Embodiment

The second embodiment has the following effects.

In the second embodiment, the connector 145 has an opening 148 which is open in a direction perpendicular to the plate thickness direction and into which a mating connector fits.

According to the above configuration, it is possible to fit the connector 145 and the mating connector together in a direction that is perpendicular to the plate thickness direction. During a mating or unmating operation for the connector 145, the first side surface portion 56A and the second side surface portion 156B can suppress displacement of the reinforcing plate 40 in the mating direction.

Other Embodiments (1) Although the wiring modules 10 and 110 are configured to be attached to the laminated-type power storage elements 2 in the embodiments described above, the present disclosure is not limited to this and the wiring module according to the present disclosure can be applied to power storage elements aside from laminated-type storage elements.

(2) Although the wiring modules 10 and 110 are configured to include the bus bars 20, the present disclosure is not limited to this configuration. As one example, a configuration may be used where the wiring module is mounted on power storage elements whose electrode terminals have been connected in advance, and may be connected to the electrode terminals directly or via metal pieces.

(3) Although a configuration where the reinforcing portion 31 is provided with the connectors 45 and 145 is used in the above embodiments, the present disclosure is not limited to this, and a configuration where the wiring module does not include a connector may be used.

(4) Although the above embodiments are configured so that the FPC 30 includes the connection recesses 35 and the bus bar connecting portions 38 are provided around the connection recesses 35, the present disclosure is not limited to this and a configuration where the flexible printed circuit board does not include connection recesses may be used.

LIST OF REFERENCE NUMERALS

1: Power storage module
2 Power storage element
3 Electrode terminal
10, 110 Wiring module
20 Bus bar
21 Bus bar main body portion
22 Protruding portion
30 Flexible printed circuit board
31 Reinforcing portion
32 First routing portion
33 Second routing portion
34 Second through-hole
35 Connection recess
36 Base film
37 Conductive path
38 Bus bar connecting portion
39 Connector connecting portion
40 Reinforcing plate
41 Attachment surface
42 Rear surface
43 Outer edge portion
44 First through-hole 45, 145 Connector
46 Housing
47, 147 Terminal
48, 148 Opening
49 Fixing portion
50 Protector
51 Electrode receiving portion
52 Bus bar holding portion
53 Positioning hole
54, 154 Mounting recess
55 Placement surface
56 Side surface portion
56A First side surface portion
56B, 156B Second side surface portion
56C Third side surface portion
56D Fourth side surface portion
57 Bottom surface portion
58 Engaging portion
59 Engagement catch
59A Rear end portion
59B Inclined portion
60 First flexible piece
61 Restraining portion
62 Pressing portion
63 Second flexible piece
64 Insertion space

The invention claimed is:
1. A wiring module to be attached to a plurality of power storage elements comprising:
a flexible printed circuit board;
a reinforcing plate attached to the flexible printed circuit board; and
a protector for holding the flexible printed circuit board and the reinforcing plate,
wherein the flexible printed circuit board is electrically connected to electrode terminals of the plurality of power storage elements,
the reinforcing plate has an attachment surface to which the flexible printed circuit board is attached,
the protector is provided with a mounting recess where the reinforcing plate is mounted, and
the mounting recess includes a plurality of side surface portions for suppressing displacement of the reinforcing plate in a direction that is perpendicular to a plate thickness direction of the reinforcing plate and an engaging portion for engaging an end portion of the attachment surface and suppressing displacement of the reinforcing plate in the plate thickness direction.
2. The wiring module according to claim 1,
wherein the flexible printed circuit board includes a connector, and
the connector is provided on an opposite side of the flexible printed circuit board to the reinforcing plate.
3. The wiring module according to claim 2,
wherein the connector includes an opening which is open in the plate thickness direction and into which a mating connector fits.
4. The wiring module according to claim 2,
wherein the connector includes an opening which extends in a direction perpendicular to the plate thickness direction and into which a mating connector fits.
5. The wiring module according to claim 1,
wherein a plurality of the engaging portions are provided, and the engaging portions are disposed so as to be spaced apart from each other around an outer periphery of the mounting recess.

6. The wiring module according to claim 1, wherein the engaging portion includes:

an engagement catch capable of elastic deformation in a direction perpendicular to the plate thickness direction; and a restraining portion that suppresses displacement of the reinforcing plate toward an outside of the mounting recess when the reinforcing plate is mounted in the mounting recess by bending the engagement catch.

7. The wiring module according to claim 6, wherein the plurality of side surface portions include a first side surface portion and a second side surface portion that are perpendicular to a first direction that is perpendicular to the plate thickness direction, the engagement catch is provided on the first side surface portion and is capable of elastic deformation in the first direction, the restraining portion is provided on the second side surface portion, and the engagement catch includes an inclined portion that is inclined so that a length by which the engagement catch protrudes from the first side surface portion toward the second side surface portion increases in a depth direction of the mounting recess, which is the plate thickness direction.

8. The wiring module according to claim 7, wherein the mounting recess includes a pressing portion that suppresses displacement of the reinforcing plate in the first direction by pressing an outer edge portion of the reinforcing plate against the first side surface portion.

9. The wiring module according to claim 8, wherein the pressing portion is provided on the second side surface portion side of the mounting recess, a direction that is perpendicular to the plate thickness direction and the first direction is a second direction, and the engagement catch and the pressing portion are disposed at a same position in the second direction.

10. The wiring module according to claim 7, wherein the flexible printed circuit board is disposed at one end in the first direction of the protector.

11. The wiring module according to claim 1, further comprising bus bars to be connected to the electrode terminals, wherein the protector includes a bus bar holding portion for holding the bus bars, the flexible printed circuit board includes bus bar connecting portions to be connected to the bus bars, and the reinforcing plate is disposed between the bus bar connecting portions that are adjacent.

* * * * *